US011322178B2

(12) United States Patent
Zheng et al.

(10) Patent No.: US 11,322,178 B2
(45) Date of Patent: May 3, 2022

(54) REFLECTIVE HOLOGRAPHIC OPTICAL STORAGE METHOD AND DEVICE

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/152,417

(22) Filed: Jan. 19, 2021

(65) Prior Publication Data

US 2021/0225401 A1 Jul. 22, 2021

(30) Foreign Application Priority Data

Jan. 21, 2020 (CN) .......................... 202010070683.3

(51) Int. Cl.
*G11B 7/0065* (2006.01)
*H04N 5/89* (2006.01)
*G03H 1/26* (2006.01)
*G11B 7/08* (2006.01)

(52) U.S. Cl.
CPC ......... *G11B 7/0065* (2013.01); *G03H 1/2645* (2013.01); *G11B 7/083* (2013.01); *G03H 2222/56* (2013.01); *G03H 2250/42* (2013.01)

(58) Field of Classification Search
CPC ........ G11B 7/0065; G11B 2007/00658; G11B 2220/2504; G11B 2007/00653; H04N 5/89; H04N 5/91
USPC .......................................................... 369/103
See application file for complete search history.

(56) References Cited

U.S. PATENT DOCUMENTS

| 5,978,112 A * | 11/1999 | Psaltis .................. G03H 1/2645 359/10 |
| 8,289,597 B2 * | 10/2012 | Hossfeld .............. G11B 7/1353 359/10 |
| 2008/0117788 A1 * | 5/2008 | Kasazumi .............. G11B 7/126 369/103 |

* cited by examiner

*Primary Examiner* — Nabil Z Hindi
(74) *Attorney, Agent, or Firm* — Muncy, Geissler, Olds & Lowe, P.C.

(57) ABSTRACT

The present invention discloses a reflective holographic storage method and device, in which a reflection layer is plated on a back side of a holographic storage medium, and a new reference light is formed by utilizing the reflection layer, so that a phase conjugate reproduction light of a hologram is obtained. According to the invention, a recording device and a reading device can be provided on the same side of a medium, thereby obtaining a more compact system, reducing design difficulty, improving system stability, and improving the SNR (signal-noise ratio) of reproduction light by the interference between reproduction light and a conjugate reproduction light.

13 Claims, 4 Drawing Sheets

REFLECTIVE HOLOGRAPHIC OPTICAL STORAGE METHOD AND DEVICE

CROSS REFERENCE TO RELATED APPLICATIONS

The present application claims priority from Chinese Patent Application No. 202010070683.3 filed on Jan. 21, 2020, all of which are hereby incorporated herein by reference.

TECHNICAL FIELD

The invention relates to the technical field of holographic optical storage, in particular to a reflective holographic optical storage method and device.

BACKGROUND ART

A spherical reference beam shift multiplex storage method records a hologram using a spherical wave as a reference beam, the hologram cannot be reproduced by simply shifting the beam a small distance relative to a medium, and then a new hologram can be recorded at that position to allow adjacent holograms to reproduce independently, which is repeated multiple times, and this method is called shift multiplex recording. In this recording/reproducing method, a transmission type has been mainly used, in which a signal light and a reference light are transmitted through the medium. However, the method places a recording device and a reading device on both sides of the medium respectively, which complicates the drive configuration.

Therefore, it is necessary to propose a method and a device that can record and read the hologram at both sides of the storage medium.

SUMMARY OF THE INVENTION

The present invention aims to overcome at least one of the deficiencies in the prior art, provides a reflective holographic optical storage method and device that can record and read a hologram on the same side of a storage medium.

The present invention provides a reflective holographic optical storage method and device, in which a new reference light is formed using a reflection layer, thereby obtaining a phase conjugate reproduction signal light of the hologram, and recording and reading the hologram on the same side of the storage medium. The whole system becomes more compact, the design difficulty is reduced, and the system stability is improved.

According to the reflective holographic optical storage method provided by the invention, a reference light interferes with a signal light to form the hologram on the storage medium plated with the reflection layer; when reproducing the hologram, the same reference light is used to be incident on the same position to generate a normal reproduction light that is symmetrical and opposite to the signal light relative to a normal line of the storage medium; and a conjugate reference light is loaded to generate a conjugate reproduction light that is coaxially and opposite to the signal light.

When entering the storage medium along the normal line, the reference light is formed into the conjugate reference light after being reflected by the reflection layer.

When entering the storage medium not along the normal line, the reference light is formed into the conjugate reference light after being reflected by the reflection layer and a mirror.

Preferably, the reference light is reflected by the reflection layer twice in succession, and is reflected by the mirror along an original optical path between two reflections by the reflection layer to form the conjugate reference light.

When a reflected light enters the storage medium along the normal line and a holographic light is reproduced, the generated normal reproduction light is in the same direction with the conjugate reproduction light.

The invention further provides a storage medium, and a reflection layer is plated on one side of the storage medium. The storage medium plated with the reflection layer on one side has not recorded data. The storage medium provided by the present invention may be generated by the method described above.

The reflective holographic optical storage device provided by the present invention, including: a conjugate reference light loading device; a normal reproduction light receiving device; and a conjugate reproduction light receiving device, in which the conjugate reference light loading device forms the reference light into the conjugate reference light, the reference light generates the normal reproduction light, the conjugate reference light generates the conjugate reproduction light, and the normal reproduction light is symmetrical and opposite to the signal light relative to the normal line of the storage medium, and the conjugate reproduction light is coaxially and opposite to the signal light.

When the reference light enters the storage medium along the normal line of the storage medium, the conjugate reference light loading device is the reflection layer plated on the storage medium, and the side where the reflection layer is located is the other side on which the reference light is incident.

When the reference light enters the storage medium not along the normal line of the storage medium, the conjugate reference light loading device is the reflection layer plated on the storage medium and the mirror provided on an optical path of the reference light reflected by the reflection layer.

When the signal light enters the storage medium along the normal line, the generated normal reproduction light is in the same direction with the conjugate reproduction light, and the normal reproduction light receiving device and the conjugate reproduction light receiving device are the same receiving device.

Compared with the prior art, the beneficial effects of the present invention are as follows. A phase conjugate reproduction light can be obtained. A phase conjugate light wave refers to a light wave having the same wavefront spatially as an original light wave but propagating in an opposite direction. In a hologram memory, the phase conjugate reproduction light has a function of correcting wavefront fluctuation, lens aberration, and the like. In addition, the reproduction light and the phase conjugate reproduction light can be reproduced on the same axis. Therefore, the coherent addition of the both can be achieved. By this coherent addition, the intensity of the reproduced image can be improved by four times, and the signal-to-noise ratio can be improved.

EMBODIMENTS

Figure 1:
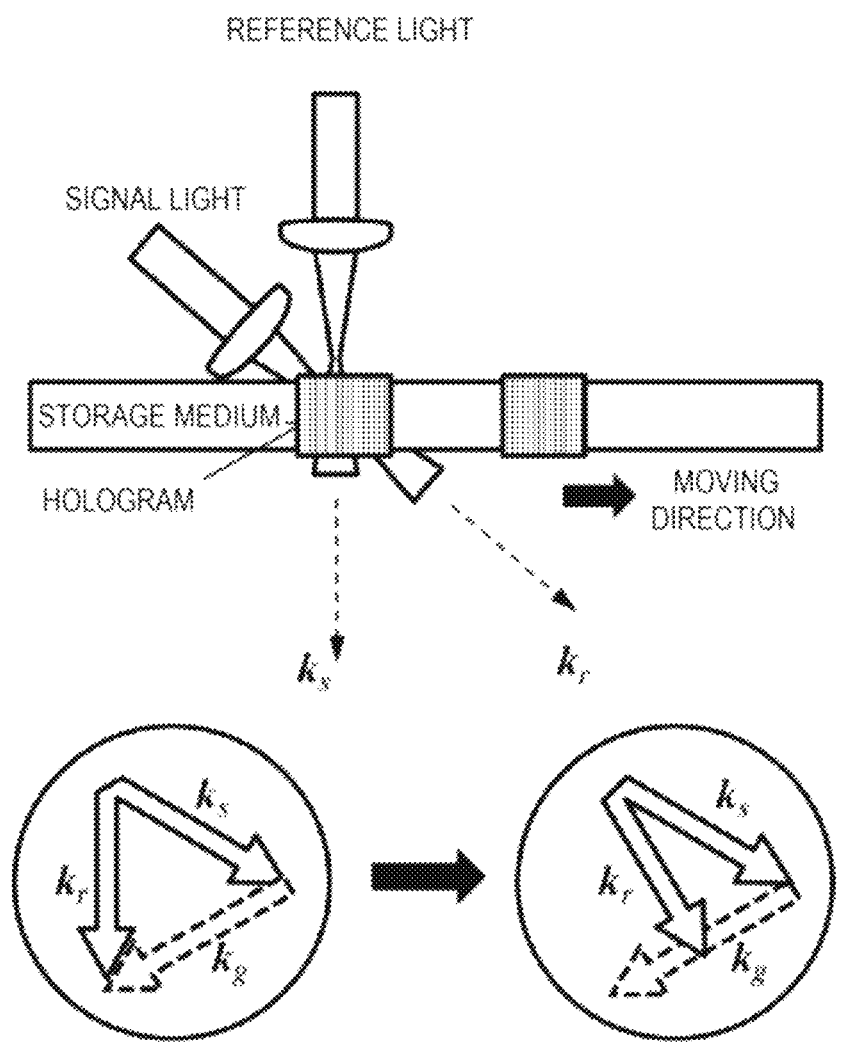
FIG. 1 is a principle diagram of shift multiplex recording of a spherical reference light.

The drawings of the present invention are for illustration purpose only and are not intended to limit the present invention. Some components in the drawings may be omitted, enlarged, or reduced for better illustrating the embodiments, and sizes of these components do not represent sizes of actual products. For those skilled in the art, it will be understood that some known structures in the drawings and descriptions thereof may be omitted.

Embodiment 1

The present embodiment provides a reflective holographic optical storage method. As shown in FIG. 1, an incident plane of a signal light coincides with that of a reference light, and an intersecting line of the incident plane and a medium surface is taken as an axis. The Bragg conditions are mismatched and a hologram cannot be reproduced by simply moving the medium a small distance along the axis after recording one hologram, then a new hologram can be recorded and the adjacent holograms can be reproduced independently, which is the shift multiplex recording. In this shift multiplex method, the hologram cannot be reproduced by simply moving the medium several microns along the axis. However, due to the fact that a shift amount required to make the hologram unable to be reproduced in a direction perpendicular to the axis is quite large, this method cannot achieve high density storage.

Figure 2:
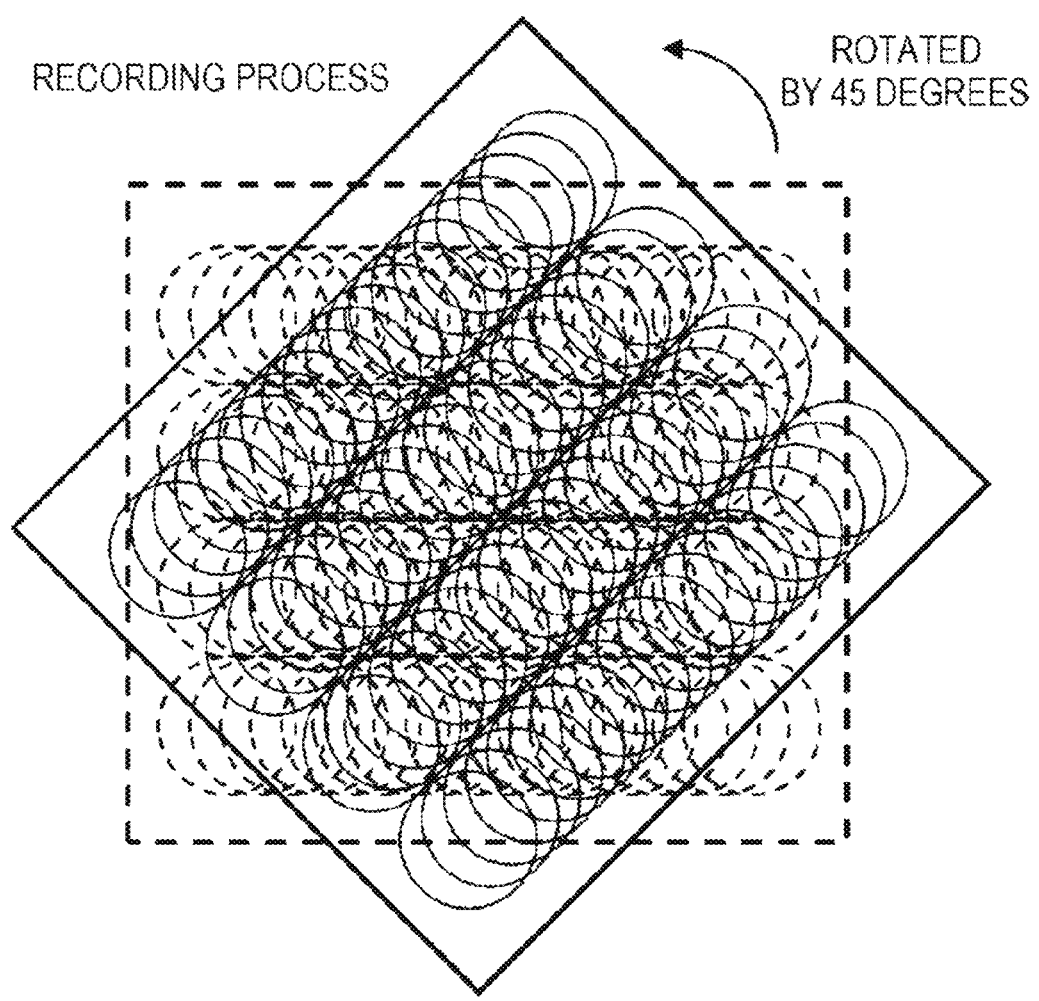
FIG. 2 is a principle diagram of cross-shift multiplexing.

The present embodiment employs a cross-shift multiplex recording method. As shown in FIG. 2, a two-dimensional hologram array is obtained by performing the shift multiplex recording in an axial direction, and then a coverage recording of a second shift multiplexing is performed by rotating the medium by a certain angle, which are repeated multiple times. This method is called cross-shift multiplex recording, which solves the problem that a multiplexing number is insufficient in a spherical wave shift multiplex recording method.

Figure 3:
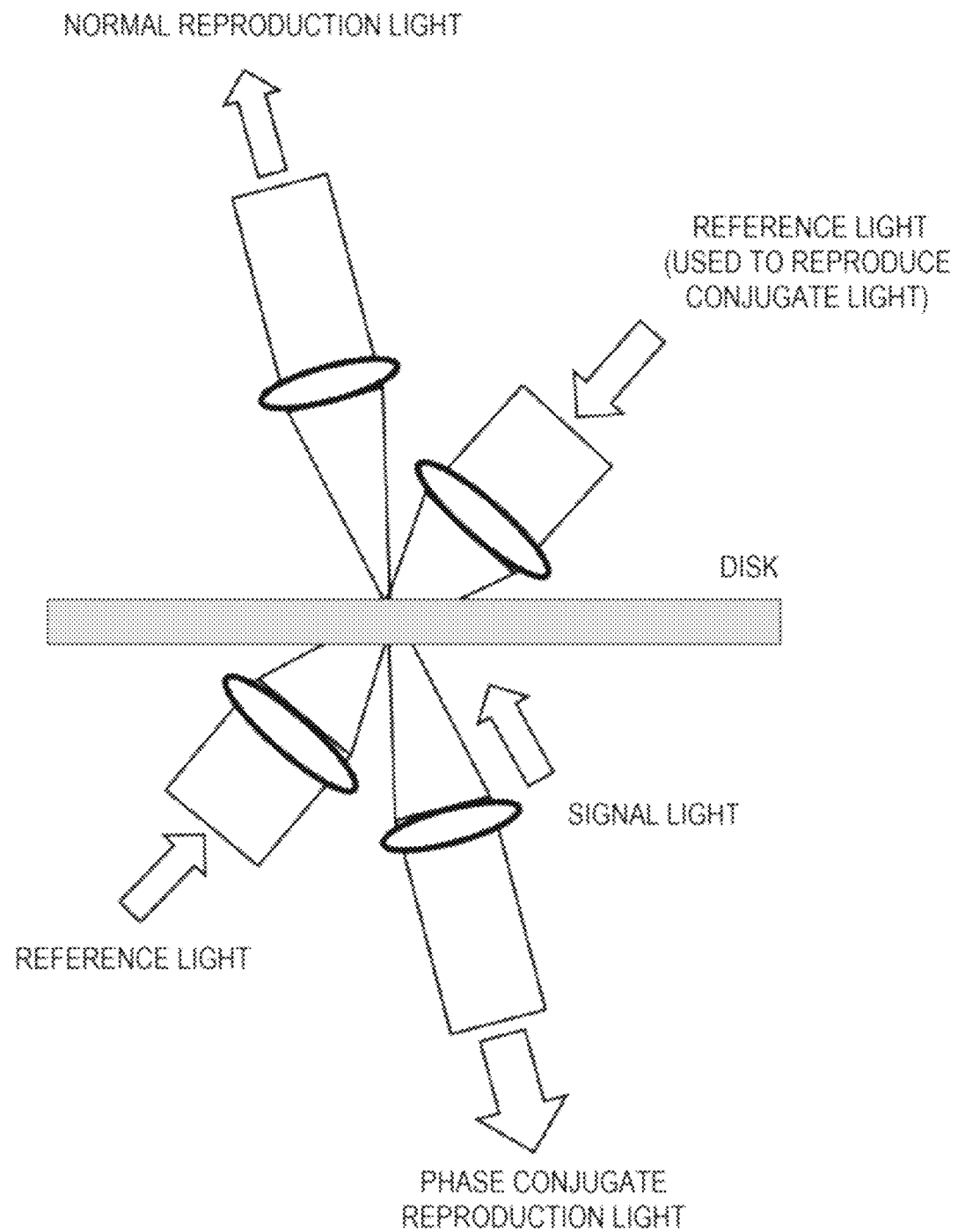
FIG. 3 is a principle diagram of hologram recording/reproducing of the spherical reference light.

In a case of transmission, an example of using a spherical reference light to record/reproduce the hologram is shown in FIG. 3. The signal light and the reference light are incident on the medium at the same time, and both interfere with each other and form the hologram in the medium. When the same reference light is used to be incident on the same position during reproduction, the reproduction light can be detected in a signal light direction, which is called normal reproduction light. On the other hand, a conjugate reference light used to generate a phase conjugate reproduction light is incident from the other side, and since the conjugate reference light is coaxially and opposite to the original reference light, a reproduction signal light obtained at this time may propagate in a direction opposite to the signal light, and the reproduction signal light is a conjugate reproduction light. At the same time, image distortion, aberration and the like generated by an optical system during the recording process can be automatically corrected and detected, leading to an improvement in a signal-to-noise ratio.

According to the reflective holographic optical storage method provided by the invention, the reference light interferes with the signal light to form the hologram on the storage medium plated with a reflection layer; when reproducing the hologram, the same reference light is used to be incident on the same position to generate the normal reproduction light that is symmetrical and opposite to the signal light relative to a normal line of the storage medium; and the conjugate reference light is loaded to generate the conjugate reproduction light that is coaxially and opposite to the signal light. In the present embodiment, the storage medium is a disk, and the reference light is the spherical reference light.

Figure 4:
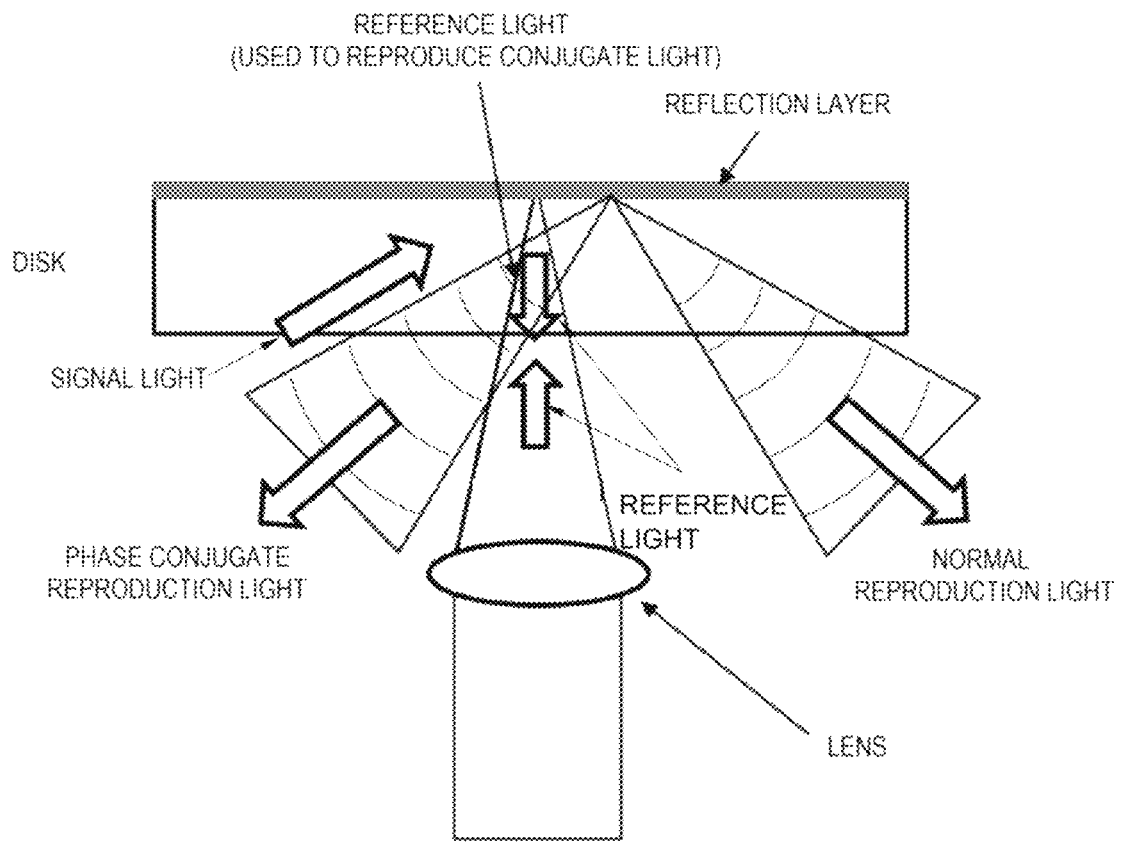
FIG. 4 is a principle diagram of phase conjugate reflective reproduction of the spherical reference light.

As shown in FIG. 4, the reference light enters the storage medium along the normal line, and is reflected by the reflection layer to form the conjugate reference light. That is, the spherical reference light is perpendicularly incident on the medium plated with the reflection layer, and interferes with the signal light incident on the medium to form the hologram. When the signal is reproduced, the same reference light is incident on the medium. On the one hand, the normal reproduction light obtained by direct reproducing the reference light emits out of the right side of the medium after being reflected by the reflection layer; on the other hand, the incident reference light is reflected by the reflection layer to form the conjugate reference light. The conjugate reference light is coaxial and opposite to the original reference light, and is reproduced to obtain the phase conjugate reproduction light. In this method, the reproduction light and the phase conjugate reproduction light can be reproduced simultaneously.

When entering the storage medium not along the normal line, the reference light is formed into the conjugate reference light after being reflected by the reflection layer and a mirror. Preferably, the reference light is reflected by the reflection layer twice in succession, and is reflected by the mirror along an original optical path between two reflections by the reflection layer to form the conjugate reference light.

Figure 5:
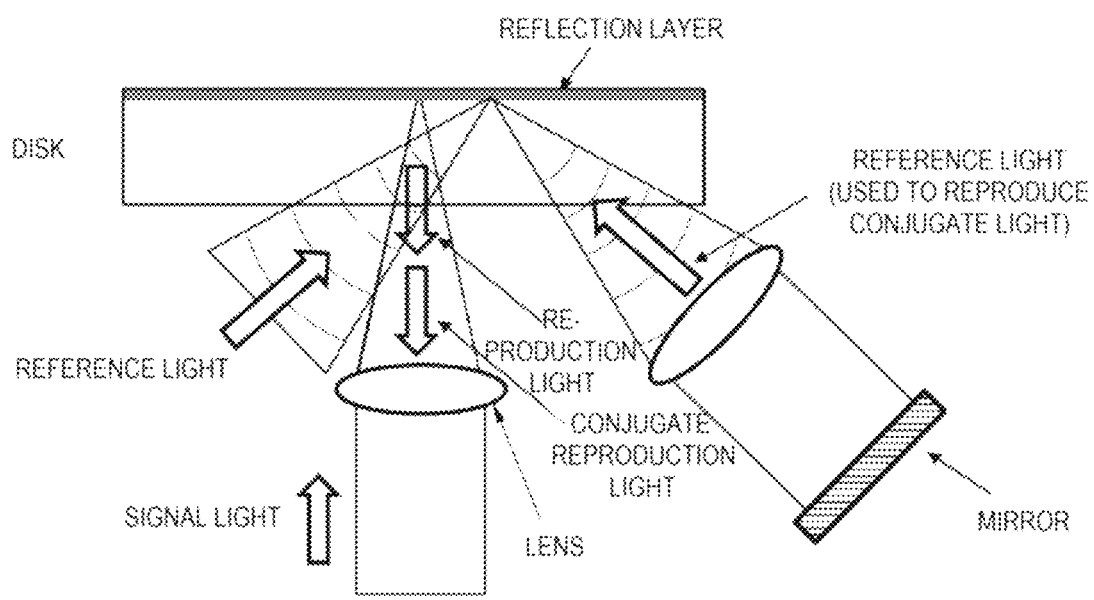
FIG. 5 is a principle diagram of coherent addition of a normal reproduction light and a phase conjugate reproduction light of the spherical reference light.

In a particular implementation, when a reflected light enters the storage medium along the normal line and a holographic light is reproduced, the generated normal reproduction light is in the same direction with the conjugate reproduction light. As shown in FIG. 5, the signal light is perpendicularly incident on a reflective storage medium, and interferes with the reference light incident on the medium to form the hologram. When the signal is reproduced, the same reference light is incident on the medium. On the one hand, the reproduction light obtained by the reference light being incident on the medium is reflected by the reflection layer to obtain a reflected reproduction light that is coaxial and opposite to the signal light; on the other hand, the reference light enters the medium and is reflected by the reflection layer, the reflected reference light is reflected by the mirror along an optical path of the reference light reflected by the reflection layer and is reflected to the storage medium, and then is reflected by the reflection layer to obtain the conjugate reference light that is coaxial and opposite to the original reference light. The conjugate reference light acts on the hologram, and reproduces the signal light to obtain the phase conjugate reproduction light. At this time, as shown in FIG. 5, the phase conjugate reproduction light and the normal reproduction light are propagated in an exactly the same optical path, and both are coaxial and in the same direction. By the coherent addition of the two reproduction lights, a light intensity of an image can be improved by four times.

The reference light and the signal light also can be incident on the storage medium in a non-perpendicular manner, which can also realize recording and reproduction of the hologram on the same side of the storage medium.

Embodiment 2

Embodiment 2 provides a holographic storage medium, which may be a storage medium that has not yet recorded data for holographic storage, or a holographic storage medium that has recorded data. As shown in FIGS. 4 and 5, one side of the storage medium is plated with a reflection layer. As to the holographic storage medium that has recorded data, the storage medium plated with the reflection layer on one side has not recorded data. The holographic storage medium provided by Embodiment 2 is a disk, and other types of holographic optical storage media are also adopted.

The storage medium provided in this embodiment may be generated by the method described in Embodiment 1, and the storage medium provided by in this embodiment can adopt the method described in Embodiment 1.

Embodiment 3

Embodiment 3 provides a reflective holographic optical storage device, including: a conjugate reference light loading device; a normal reproduction light receiving device; and a conjugate reproduction light receiving device. The conjugate reference light loading device forms a reference light into a conjugate reference light, the reference light generates a normal reproduction light, the conjugate reference light generates a conjugate reproduction light, the normal reproduction light is symmetrical and opposite to a signal light relative to a normal line of a storage medium, and the conjugate reproduction light is coaxially and opposite to the signal light.

As shown in FIG. 4, when the reference light enters the storage medium along the normal line of the storage medium, the conjugate reference light loading device is a reflection layer plated on the storage medium, and a side where the reflection layer is located is the other side on which the reference light is incident.

When the reference light enters the storage medium not along the normal line of the storage medium, the conjugate reference light loading device is the reflection layer plated on the storage medium and the mirror provided on an optical path of the reference light reflected by the reflection layer. Preferably, as shown in FIG. 5, when the signal light enters the storage medium along the normal line, the generated normal reproduction light is in the same direction with the conjugate reproduction light, and the normal reproduction light receiving device and the conjugate reproduction light receiving device are the same receiving device.

The reflective holographic optical storage device according to Embodiment 3 may implement the method described in Embodiment 1, and generate the holographic storage medium described in Embodiment 2.

Obviously, the above embodiments of the present invention are merely examples for clear illustration of the technical solution in the invention, and are not intended to limit the implementations of the present invention. Any modification, equivalent substitution, improvement, or the like within the spirit and principle of the claims of the invention should be included in the scope of the claims of the invention.

The invention claimed is:

1. A reflective holographic recording/reproducing method, comprising:
using a spherical wave as a reference light of shift multiplex recording, wherein an optical axis of the reference light is perpendicularly incident on a storage medium on which a reflection layer is plated; and
generating a phase conjugate reproduction light of a hologram by the reference light that is transmitted through the medium and reflected back to the medium by the reflection layer.

2. The holographic recording/reproducing method according to claim 1, wherein the reference light incident on a medium and the reference light transmitted through the medium and reflected by the reflection layer are propagated coaxially.

3. A reflective holographic recording/reproducing method, comprising:
performing vertical incidence of a signal light on a storage medium plated with a reflection layer in a shift multiplex recording hologram memory using a spherical wave as a reference light; and
obtaining a phase conjugate reproduction light in a manner that a reference light transmitted through a medium reproduces a hologram after the reference light is reflected via the reflection layer.

4. The holographic recording/reproducing method according to claim 3, wherein a reproduction light and the phase conjugate reproduction light thereof are coaxially and coherently added.

5. A reflective holographic optical storage method, comprising:
performing an interference between a reference light and a signal light to form a hologram on a storage medium plated with a reflection layer;
using the same reference light to be incident on the same position to generate a normal reproduction light that is symmetrical and opposite to the signal light relative to a normal line of the storage medium when reproducing the hologram; and
loading a conjugate reference light to generate a conjugate reproduction light that is coaxially and opposite to the signal light.

6. The holographic optical storage method according to claim 5, wherein the reference light enters the storage medium along the normal line to form the conjugate reference light after being reflected by the reflection layer.

7. The holographic optical storage method according to claim 5, wherein the reference light enters the storage medium not along the normal line to form the conjugate reference light after being reflected by the reflection layer and a mirror.

8. The holographic optical storage method according to claim 7, wherein the reference light is reflected by the reflection layer twice in succession, and is reflected by the mirror along an original optical path between two reflections by the reflection layer to form the conjugate reference light.

9. The holographic optical storage method according to claim 7, wherein a reflected light enters the storage medium along the normal line, and when a holographic light is reproduced, the generated normal reproduction light is in the same direction with the conjugate reproduction light.

10. A reflective holographic optical storage device, comprising:
a conjugate reference light loading device;
a normal reproduction light receiving device; and
a conjugate reproduction light receiving device,
wherein the conjugate reference light loading device forms a reference light into a conjugate reference light, the reference light generates a normal reproduction light, the conjugate reference light generates a conjugate reproduction light, the normal reproduction light is symmetrical and opposite to a signal light relative to a normal line of a storage medium, and the conjugate reproduction light is coaxially and opposite to the signal light.

11. The holographic optical storage device according to claim 10, wherein when the reference light enters the storage medium along the normal line of the storage medium, the conjugate reference light loading device is a reflection layer plated on the storage medium, and a side where the reflection layer is located is the other side on which the reference light is incident.

12. The holographic optical storage device according to claim 10, wherein when the reference light enters the storage medium not along the normal line of the storage medium, the conjugate reference light loading device is the reflection layer plated on the storage medium and a mirror provided on an optical path of the reference light reflected by the reflection layer.

13. The holographic optical storage device according to claim 12, wherein when the signal light enters the storage medium along the normal line, the generated normal reproduction light is in the same direction with the conjugate reproduction light, and the normal reproduction light receiving device and the conjugate reproduction light receiving device are the same receiving device.

* * * * *